W. A. YOUNG & G. E. S. PHILLIPS.
CHEESE-CUTTING GAGE.

No. 173,710. Patented Feb. 15, 1876.

Witnesses
Benjamin C. Pole
N. L. Bostick

W. A. Young
G. E. S. Phillips
Charles S. Whitman

Inventor.

UNITED STATES PATENT OFFICE.

WILLIAM A. YOUNG AND GEORGE E. S. PHILLIPS, OF BERRYVILLE, VA.

IMPROVEMENT IN CHEESE-CUTTING GAGES.

Specification forming part of Letters Patent No. 173,710, dated February 15, 1876; application filed January 6, 1876.

*To all whom it may concern:*

Be it known that we, WM. A. YOUNG and GEO. E. S. PHILLIPS, of Berryville, in the county of Clarke and State of Virginia, have invented an Improved Cheese-Knife Gage, of which the following is a specification:

Our invention relates to that class of implements which are used for cutting and measuring the weight of cheese; and the nature thereof consists in certain improvements in the construction of the same, hereinafter shown and described.

Figure 1:
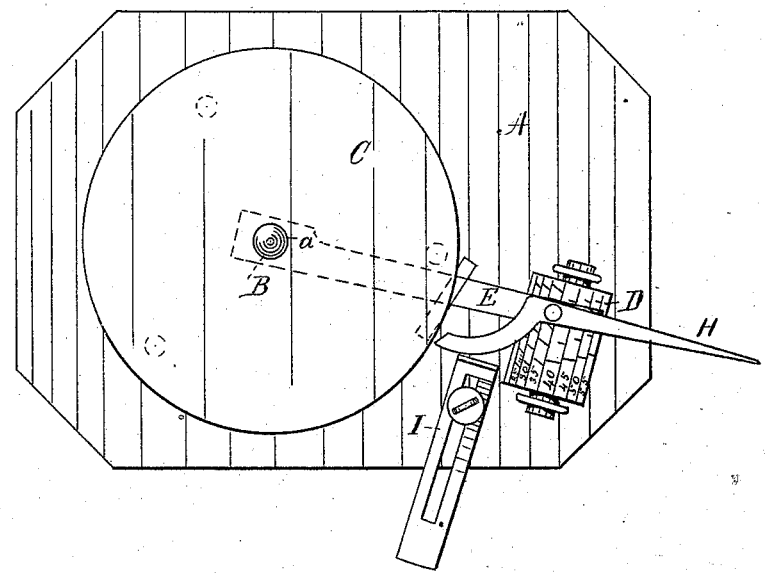
Figure 2:
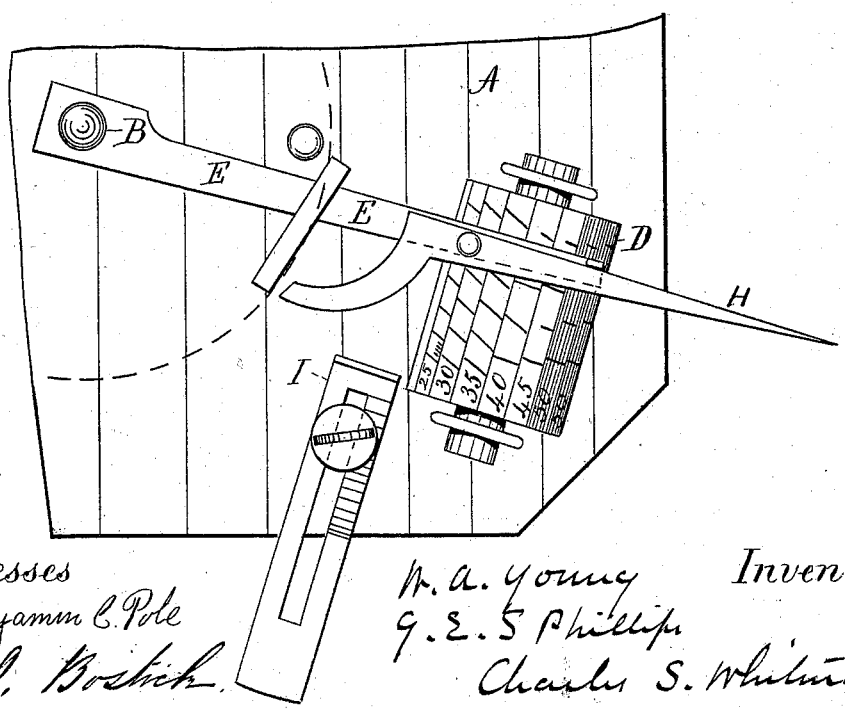

In the accompanying plate of drawings, in which corresponding parts are designated by similar letters, Figure 1 is a plan of the platform or table, having our improvements applied thereto. Fig. 2 is a view on an enlarged scale of the registering mechanism.

The cheese-board C is similar in construction and operation to that for which Letters Patent were granted to us on the 29th of December, A. D. 1874.

A represents the platform, table, or counter upon which the cheese is to be placed. B is a pivot rigidly attached to said platform, and passing through a hole in the cheese-board C in such a manner as to project into the cheese and prevent it from slipping. To the board A are attached blocks or cleats for said cheese-board C to rest on, so that it may be firmly supported while the cheese is being cut and that there be little friction while the said cheese-board is being turned. D designates the registering-roller, having its bearing in the platform A, and thirteen sides or faces, upon which are marked the numbers indicating weight. E is a lever, to the end of which the small lever H is pivoted in such a manner that when the handle is moved to the left the pointed end of said small lever catches in the outer periphery of the disk k, and causes it to rotate. When the handle is moved to the right, the pointed end becomes disengaged from the disk. I is a screw-plate, so arranged as to slide upon the table A, and to be clamped in any required position, to regulate the length of the arc described by the lever.

The operation of the implement may be illustrated by the following example:

A cheese weighing thirty-five pounds is placed upon the board C. The roller-gage is turned so that the face upon "35" is marked is uppermost. If it is desired to cut the cheese into pounds, the slide-plate is moved up to the point marked on the gage, thereby pushing the lever toward the slide-plate; it moves the distance of one pound, carrying the cheese-board with it and placing the cheese directly under the knife.

Having thus described our invention, we claim and desire to secure by Letters Patent of the United States—

The combination of the cheese-board, the levers, the roller-gage, and the screw-plate, as and for the purpose described.

In testimony that we claim the foregoing, we have hereunto set our hands this 30th day of November, 1875.

W. A. YOUNG.
     G. E. S. PHILLIPS.

Witnesses:
 J. RICE SMITH,
 J. M. GIBSON.